United States Patent [19]
Lawton et al.

[11] Patent Number: 6,160,923
[45] Date of Patent: Dec. 12, 2000

[54] USER DIRECTED DUST AND COMPACT ANOMALY REMOVER FROM DIGITAL IMAGES

[75] Inventors: Daryl T. Lawton, Bellevue; Mahmood G. Qadir, Redmond, both of Wash.

[73] Assignee: Microsoft Corporation, Redmond, Wash.

[21] Appl. No.: 08/964,717

[22] Filed: Nov. 5, 1997

[51] Int. Cl.[7] .................................................. G06K 9/40
[52] U.S. Cl. .......................................... 382/275; 382/260
[58] Field of Search ........................... 382/275, 260–265, 382/283; 395/109; 358/1.9, 463; 348/241, 246

[56] References Cited

U.S. PATENT DOCUMENTS

| | | | |
|---|---|---|---|
| 4,189,744 | 2/1980 | Stern .......................................... | 358/93 |
| 4,590,520 | 5/1986 | Frame et al. .............................. | 358/163 |
| 4,600,946 | 7/1986 | Levine ....................................... | 348/246 |
| 5,130,789 | 7/1992 | Dobbs et al. .............................. | 358/75 |
| 5,247,610 | 9/1993 | Oshima et al. ........................... | 395/135 |
| 5,327,246 | 7/1994 | Suzuki ...................................... | 348/246 |
| 5,432,863 | 7/1995 | Benati et al. ............................. | 382/167 |
| 5,490,245 | 2/1996 | Wugofski .................................. | 395/195 |
| 5,805,745 | 9/1998 | Graf .......................................... | 382/291 |
| 5,825,941 | 10/1998 | Linford et al. ........................... | 382/294 |
| 5,920,344 | 7/1999 | Kim .......................................... | 348/246 |
| 6,014,471 | 1/2000 | Barkan et al. ............................ | 358/463 |

OTHER PUBLICATIONS

Four separate screen shots(four sheets) from Adobe Photo-Deluxe (Version 1.0) showing steps to remove red eye.
LivePix 1.0 screen shot entitled "owen standing in crib with red eye" and help topic on "Remove red eye from a photo" (2 pages).
Adobe Photoshop® version 4.0 User Guide including Table of Contents and selected pages.
Akamatsu, et al., "An Accurate and Robust Face Identification Scheme," *IEEE*, 217–220 (1992).
Brunelli, et al., "Caricatural Effects in Automated Face Perception", *Biological Cybernetics*, 69, 235–241 (1993).
Chen, et al., "Human Face Recognition From a Single Front View," *International Journal of Pattern Recognition and Artificial Intelligence*, 6(4), 571–693 (1992).
Chow, et al., "Towards a System for Automatic Facial Feature Detection," *Pattern Recognition*, 26(12), 1739–1755 (1993).
Huang, et al., "Automatic Feature Point Extraction on a Human Face in Model–based Image Coding," *Optical Engineering*, 32(7), 1571–1580 (1993).
Huang, et al, "Human Facial Feature Extraction for Face Interpretation and Recognition," *IEEE*, 25 204–207 (1992).
Huang, et al. "Human Facial Feature Extraction for Face Interpretation and Receognition," *Pattern Recognition*, 25 (12), 1435–1444 (1992).
Kamel, et al. "System for the Recognition of Human Faces," *IBM Systems Journal*, 32(2), 307–320 (1993).
Samal, et al. "Automatic Recognition and Analysis of Human Faces and Facial Exressions; A Survey," *Pattern Recognition*, 25 (1), 65–77 (1992).

*Primary Examiner*—Thomas D. Lee
*Assistant Examiner*—Stephen Brinich
*Attorney, Agent, or Firm*—Leydig, Voit & Mayer, Ltd.

[57] ABSTRACT

A technique of editing a digital image provides for the automatic removal of blotchy areas. From a user interface of a computer system, a user of the computer system identifies a location of a blotchy area to be removed in the digital image in response to prompting by the user interface. Based on the location provided by the user, the technique automatically determines the location of the blotchy area. Attributes of pixels comprising the digital image in a neighborhood around the blotchy area are automatically collected, while excluding the pixels comprising the blotchy area. The corrupted values of the pixels of the blotchy area are replaced with values derived at least in part from the attributes of the neighboring pixels Several different embodiments are described with various degrees of automation, including one embodiment in which all blotches of a character similar to the one selected by the user are automatically identified and removed.

23 Claims, 12 Drawing Sheets

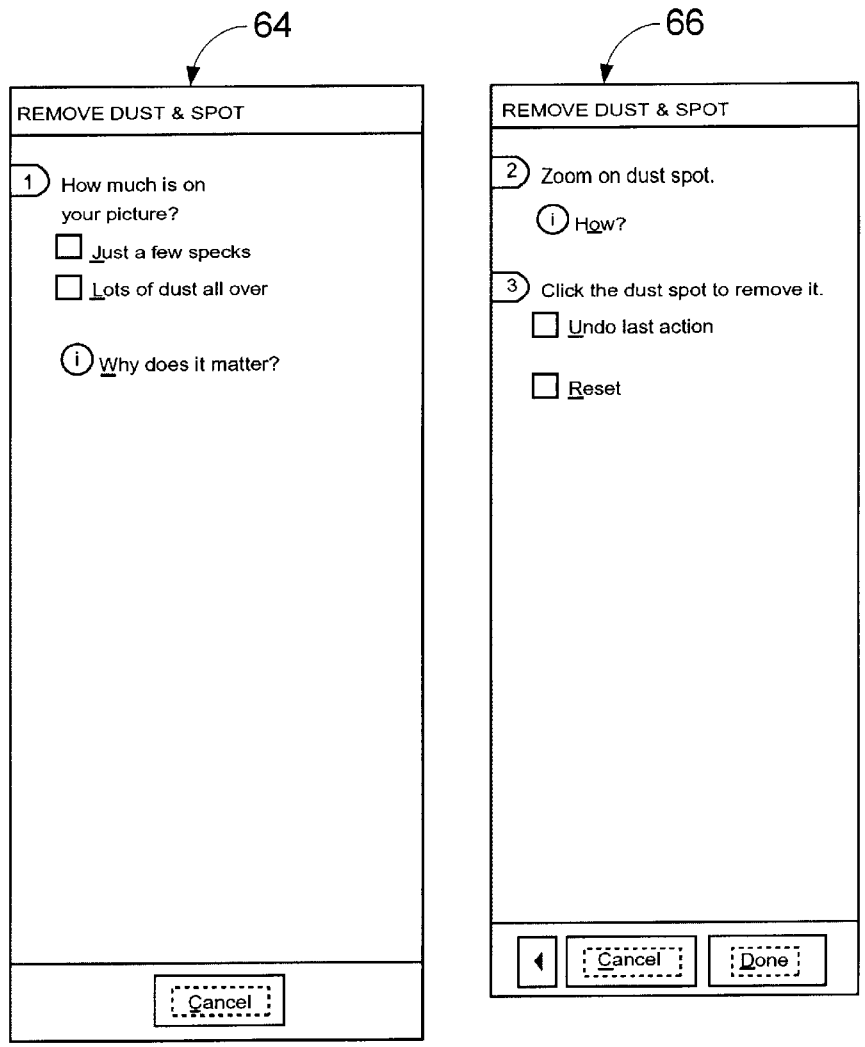
FIG. 2A  FIG. 2B
FIG. 3
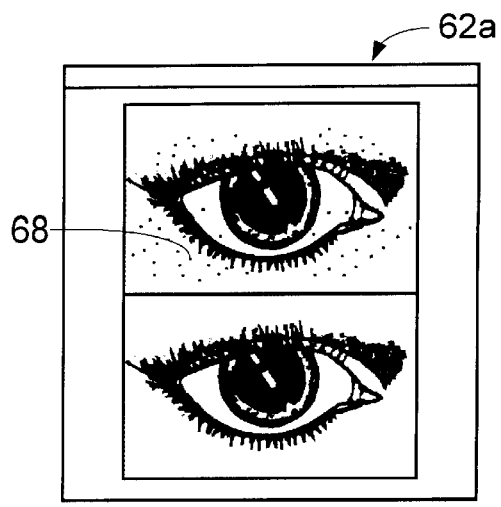

Automatic Extraction of Spot and Generation of Median Void Mask

LOCATING THE SPOT TO BE CORRECTED

GENERATING THE MASK

Cells of Pixels inslused in the mask

Cells of Pixels excluded from the mask

A PIXEL IS PART OF THE NEIGHBORHOOD IF IT IS WITHIN AN AREA IDENTIFIED BY THE MASK. IF A PIXEL WITHIN THE VOID HAS BEEN FILLED, IT MAY BE INCLUDED AS PART OF THE NEIGHBORHOOD. ADDITIONAL CRITERIA CAN BE APPLIED ADAPTIVELY - -E.G., TAKING THE N-BEST NEIGHBORHOOD PIXELS FOR DETERMINING THE FILL VALUE.

COLLECTING ATTRIBUTES OF THE SPOT CANDIDATES

AUTOMATIC CORRECTION OF ALL SPOTS

USER DIRECTED DUST AND COMPACT ANOMALY REMOVER FROM DIGITAL IMAGES

CROSS-REFERENCE TO RELATED APPLICATIONS

This application is related to commonly owned U.S. patent application Ser. No. 08/964,629 entitled "AUTOMATED REMOVAL OF NARROW, ELONGATED DISTORTIONS FROM A DIGITAL IMAGE" to Lawton and Qadir filed on Nov. 5, 1997.

FIELD OF THE INVENTION

This invention relates to digital image processing and, more particularly, to automatically correcting a digital image in areas distorted by blotchy anomalies (e.g., dust) or in areas of the image containing unwanted but naturally-occurring artifacts (e.g., facial blemishes).

BACKGROUND OF THE INVENTION

Digital image processing has become a significant form of image processing because of continuing improvements in techniques and increasingly powerful hardware devices. Digital image processing techniques have augmented and, in some instances, replaced methods used by photographers in image composition and dark room processing. For example, digital image processing techniques such as contrast balancing, edge sharpening, color balancing, or retouching of distortions are employed for editing original photographic images. Moreover, with the aid of a computer, digitized images can be edited to achieve a variety of effects such as changing the shapes and colors of objects and forming composite images.

In particular, digital image processing techniques are utilized to remove unwanted objects from original print images such as photographs. These unwanted objects can be distortions of the image resulting from the deterioration of the print image caused by normal wear or catastrophic events such as water damage. The unwanted objects can also be naturally occurring in the image. For example, facial blemishes or freckles may be considered unwanted spots in the digital image.

There are several types of unwanted objects that most often appear in digital images. The types are characterized by their shapes. One type is elongated and often results from folds or scratches in original image prints. This type of unwanted object can be automatically removed using a technique described in our co-pending U.S. patent application Ser. No. 08/964,629 entitled "AUTOMATED REMOVAL OF NARROW, ELONGATED DISTORTIONS FROM A DIGITAL IMAGE" to Lawton and Qadir, filed on Nov. 5, 1997. Another type appears as spots in the displayed digital image.

Spots in the digital image are caused by many things. For example, spots in an original print from which a digital image is derived may be the effects of the print's aging. Sudden distortion of the image can result from either mechanical or chemical sources. For example, the print can be scraped or folded, which may distort the image. Exposure of the print to water can cause distortion in the image. The imaging process may be subject to electrical noise that manifests itself as spots in the digital image that has a dust or snow-like appearance. Improper film development is another possible source of distortion that may result in spots in the original print and, in turn, in the digital image. The scanning of print images sometimes picks up dust from the scanning surface, which appears as spots in the digital image. Unwanted spots can also be naturally occurring objects in the image. For example, facial blemishes or freckles may be considered unwanted spots.

As used herein, the terms "spot" and "spots" refer to a wide range of visual effect, some of which are identified above. Each of these spots in digital images is characterized by a compact and generally homogenous appearance that is distinctly different than the surrounding portions of the image.

Using known digital image processing techniques, it is possible to automatically remove some types of spots from digital images. When the spots are small and appear as dust or snow in the digital image, a known technique for their automatic removal employs a median filter that attenuates the brightness of the pixels in the image having the most extreme brightness values. Unfortunately, this technique does not distinguish between a pixel whose brightness is a characteristic of an unwanted spot and a pixel whose brightness is a natural and desired attribute of the image. As a result of this inability to distinguish between these two types of pixels, all pixels are effected, which tends to degrade the quality of the image.

For example, one current imaging application sold under the brand name "ADOBE PHOTOSHOP" offers a correction tool which applies a median filter over the complete image for the purpose of removing noise through the blurring thereof to the point where it is no longer noticeable. Unfortunately, this process also tends to blur the details of the remaining portions of the digitized image causing a degradation in overall image quality. Another imaging application, sold by Metatools Inc. under the brand name Kai's Photo Soap includes an interactive user interface that assists the user to paint over a spot.

The foregoing approach for enhancing the quality of a digital image is just one example of several known ways to use pixel averaging techniques for automatically removing noise from a digital image that appears as snow or dust. Other known approaches for enhancing image quality include, for example, Fourier Frequency Transform filtering techniques for automatically removing noise that appears in a spatially regular pattern throughout the image.

Large spots in the digital image, which appear more like blotches than snow or dust, are not amenable to correction using any of the foregoing techniques. Instead, common techniques for removing such blotchy spots employ digital painting techniques. These techniques are not automatic and they depend on individual artistic and computer skills to subjectively cover or replace the area of the image occupied by the spot with a corrected image in a manner that simulates painting a canvas. Thus, the quality of the correction achieved using an approach that incorporates digital painting varies widely since it depends on the individual skills of the person making the correction. Also, such techniques require expensive workstations having dedicated, special-purpose hardware. While these techniques work for their intended purpose, they are relatively expensive and impractical for persons unskilled in digital painting.

In view of the foregoing, a need exists for a process to remove blotchy spots from a digital image without requiring technical skill, artistic ability, or manual dexterity on the part of the user. Such a system would allow an unskilled user to remove such spots from a digital image while maintaining overall image quality without requiring undue expense or the assistance of a specialist.

SUMMARY OF THE INVENTION

According to the invention, unwanted spots in a digital image are automatically removed by an image processing technique initiated by a user of a computer system in which the image resides, where the spots are in the form of blotchy distortions or blotchy naturally occurring artifacts such as facial blemishes or freckles.

Categorically, the invention is primarily directed to the automatic correction of large unwanted spots in a digital image, which are not corrected by the conventional automatic techniques primarily intended to correct small spots that appear as snow or dust. Instead, the invention is aimed at correcting a digital image by removing spots that appear as blotches. The process is initiated by the user, who identifies a spot in the image to be corrected. Once the spot has been identified, the correction occurs automatically from the user's viewpoint.

From a user interface of the computer system, the user first selects a spot of a displayed image to be edited. The user communicates this selection to the computer system by positioning a cursor on the displayed image. Communicating the user's selection may be done either manually or automatically as explained below.

In a manual mode of operation, the user positions the cursor over the spot. The computer system assumes the location of the spot to be centered at the location in the image indicated by the position of the cursor. The spot is assumed to have a predetermined size, but its size can be manually adjusted by the user using a sizable geometric shape on-screen, which is preferably a circle since its shape best matches the typical shape of a spot.

In an automatic mode of operation, however, the position of the cursor is not used to designate the center of the spot. Instead, the position of the cursor is used as a starting point to initiate a search of the surrounding area of the image, where the search criteria are designed to identify common characteristics of spots. Thus, in the automatic mode of operation, the user need only position the cursor in a neighborhood of the spot to be corrected. The exact location of the spot and its size and shape are automatically determined.

Regardless of how it is identified, the correction of the identified spot is based on attributes collected from a portion of the image surrounding the spot. These collected attributes are used to automatically correct the image area occupied by the spot. The collecting process includes a center-void median filter so that the pixels of the spot are excluded from the pixels whose attributes are used to correct or fill the image area of the spot.

In the automatic mode of operation, the spot is identified by collecting attributes of pixels neighboring the location of the image designated by the position of the cursor. Using a $\nabla^2 G$ operator, a map of the spot is generated from the collected attributes, which serves to identify a group of pixels in the original image as a core group of corrupted pixels. The complete set of pixels forming the spot is identified using standard techniques for region growing or connecting neighboring pixels. Alternatively, the technique in related U.S. application Ser. No. 08/964,629 may be employed to identify the spot. In searching for the spot, the collection of attributes from neighboring pixels may extend a distance that is predetermined or it may be manually determined and limited using a sizable circle (or other closed geometric form) the user positions to surround the spot.

Once the spot is located and its size and shape determined, the area of the spot is filled, using attributes of selected ones of the neighboring pixels to determine the characteristics of the fill. In this manner, a non-expert user may fix such anomalies/artifacts by simply clicking a mouse and allowing the task to automatically perform the detailed analysis required to fix the spot.

In both the manual and automatic modes, the fill process utilizes a median filter or mask having a center void. After the spot has been located and its size and shape determined either manually or automatically, the center void of the filter is sized and shaped in a manner that complements the size and shape of the spot. The mask is then mapped to the original image in order to identify the pixels whose attributes are to be used to correct the corrupted values of the pixels comprising the identified spot. The mask is mapped to the image by registering the center void of the mask with the spot.

As a further feature of the invention, attributes of the identified spot may be collected during the correction process and then used to identify and correct other spots in the image. The collected attributes of the spot characterize its size, shape and color. These attributes for the identified spot are then used to identify similar spots throughout the digital image, which are also automatically removed.

Additional features and advantages of the invention will be made apparent from the following detailed description of illustrative embodiments which proceeds with reference to the accompanying figures.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIGS. 2A and 2B are dialog boxes that appear consecutively and in place of the menu of FIG. 2 for the purpose of prompting the user to identify the region of the image which includes the spot to be removed;

FIG. 3 is a representation of an area of a digital image before and after it has been corrected by the editing technique of the invention, where the upper image in FIG. 3 represents the image area with spots and the lower image in FIG. 3 represents the same area without spots after the area has been edited;

FIG. 8A illustrates the tools and data structures for generating a binary bit map that locates areas of the digital image that are candidates for being the spot intended to be selected by the user;

FIG. 8B illustrates the tools and data structures for generating a map of line segments whose end points are points of maximum contrast having opposite gradients;

FIG. 8C illustrates the tool and data structures for correlating the two maps generated by the tools in FIGS. 8A and 8B in order to (1) identify discrete areas of the digital image that are candidates for being selected as the spot identified by the user and (2) selecting one of the candidates as the identified spot for removal;

DETAILED DESCRIPTION OF THE INVENTION

TABLE OF CONTENTS

Figure 2:
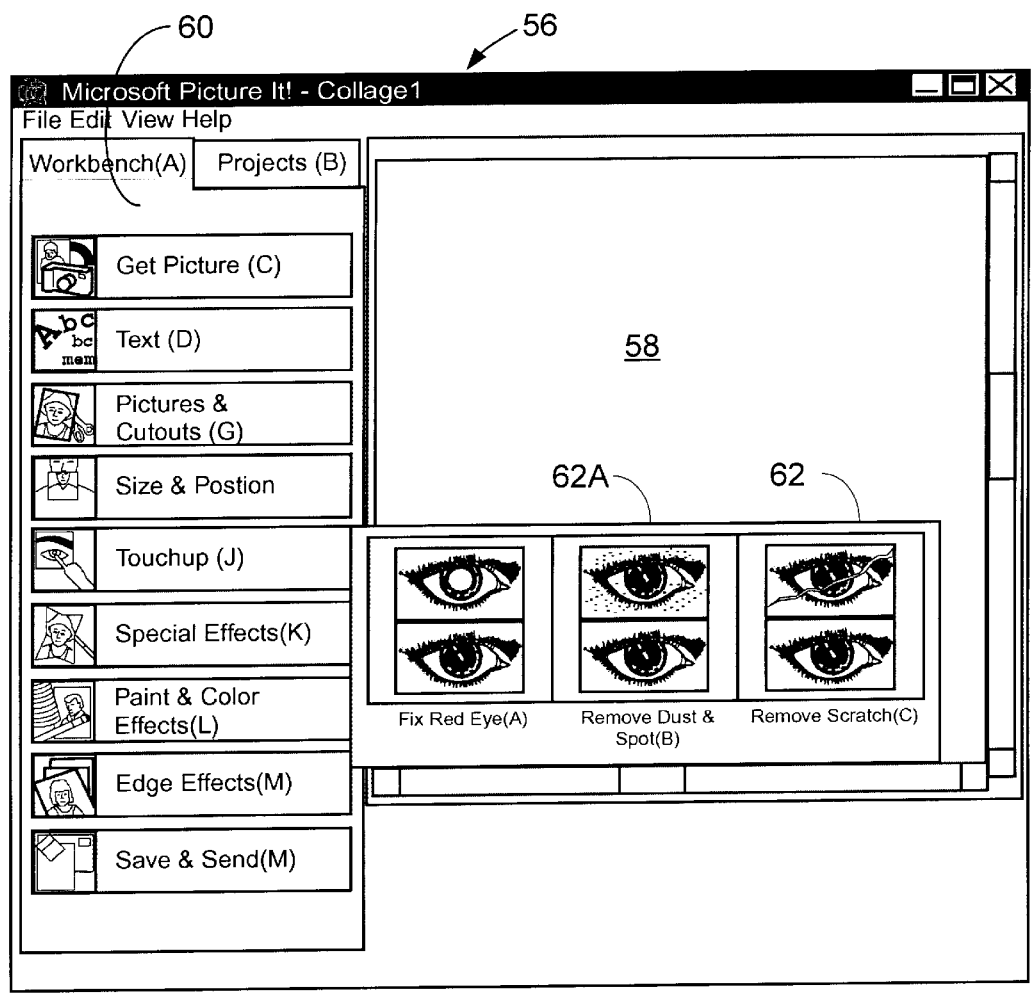
FIG. 2 is an exemplary user interface for removing large spots from a digital image in keeping with the invention, including a menu and dialog box for initiating the automatic editing of the image.
Figure 4:
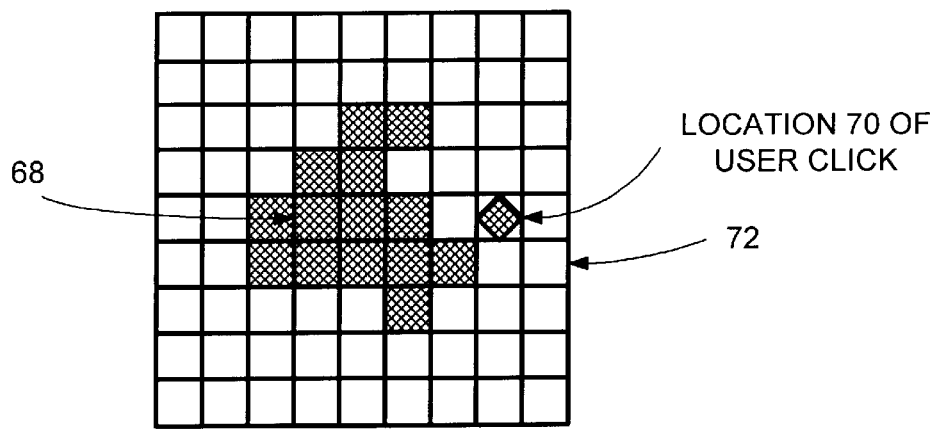
FIG. 4 is an isolated and enlarged view of one of the spots in the representation of an area of a digital image in the upper image in FIG. 3, where each square in the view represents a cell of one or more pixels comprising the digital image.
Figure 5A:
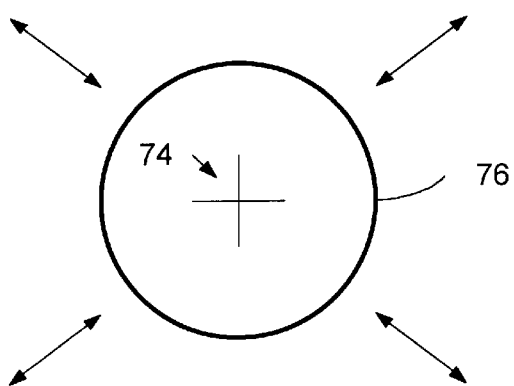
FIGS. 5A and 5B are exemplary and alternative user interface tools for identifying the spot in the area of a digital image represented in the lower image in FIG. 3 that the user wishes to remove.
Figure 5B:
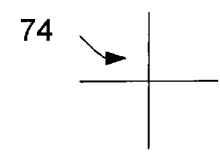
Figure 6:
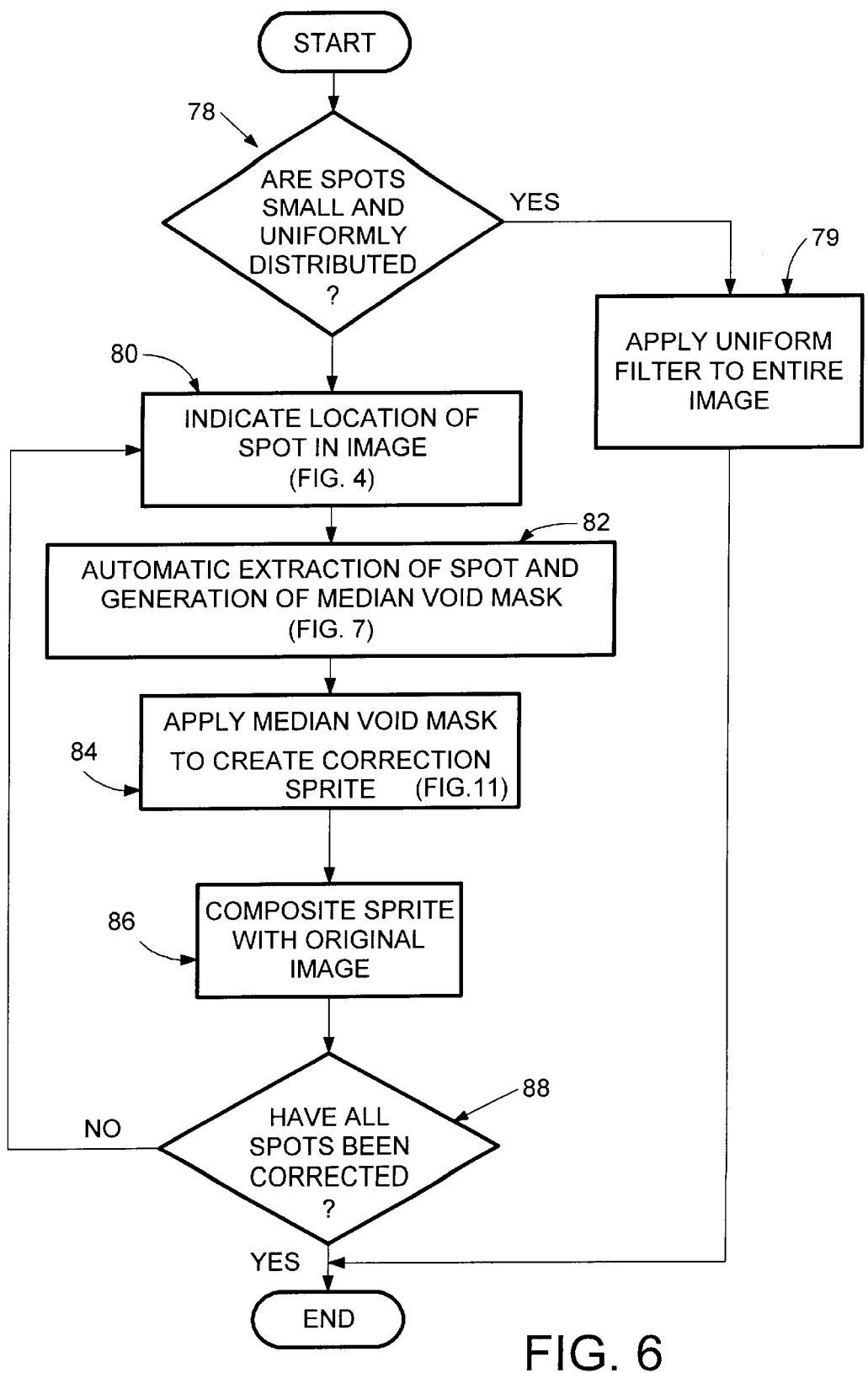
FIG. 6 is a high level flow diagram of the editing technique executed by the computer system of FIG. 1
Figure 7:
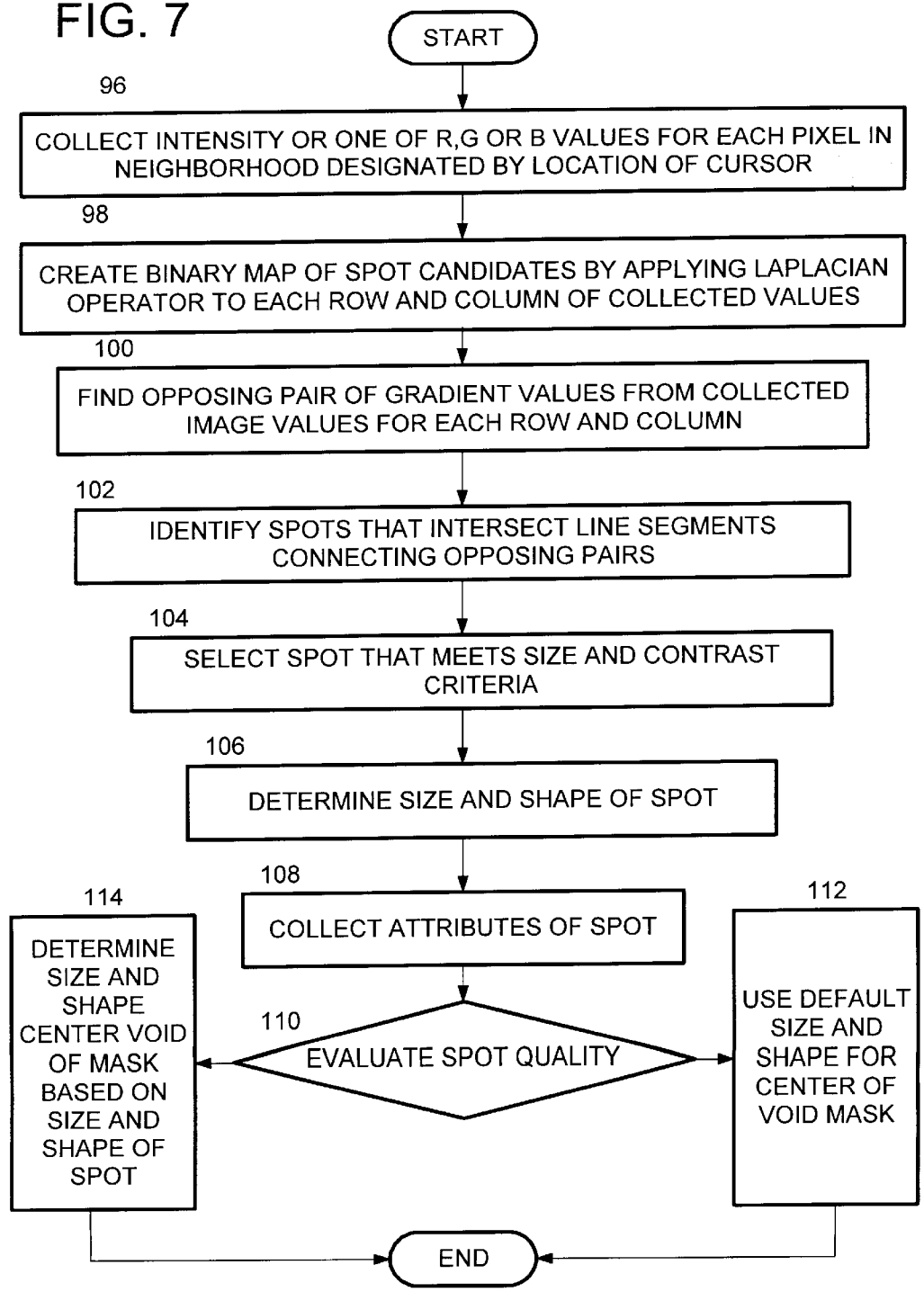
FIG. 7 is a flow diagram of an aspect of the editing technique represented by the flow diagram of FIG. 6 in which a spot is automatically extracted and a mask or filter is generated having a center voided sized and shaped to complement the size and shape of the spot.
Figure 10:
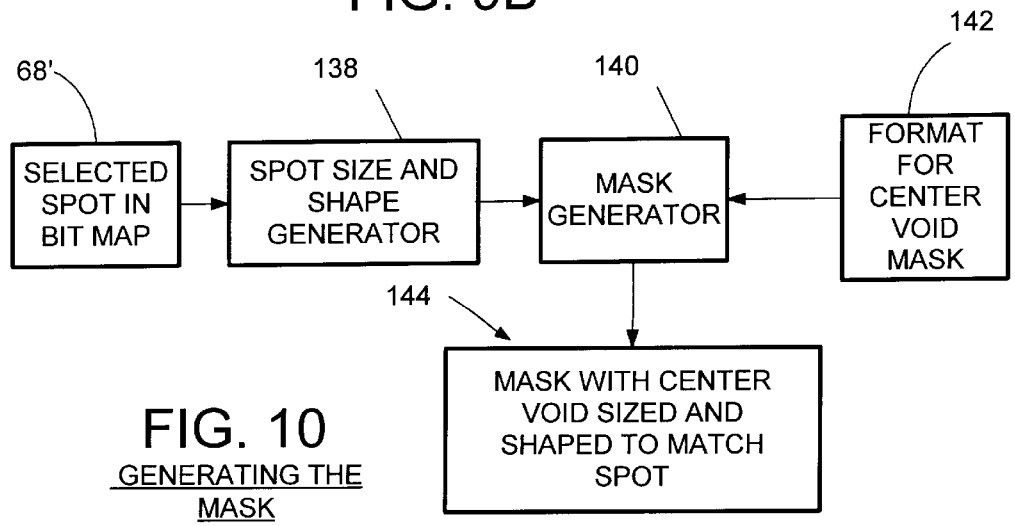
FIG. 10 illustrates the tools and data structures for generating a correction mask or filter that has a center void sized and shaped to complement the size and shape of the selected spot.
Figure 11:
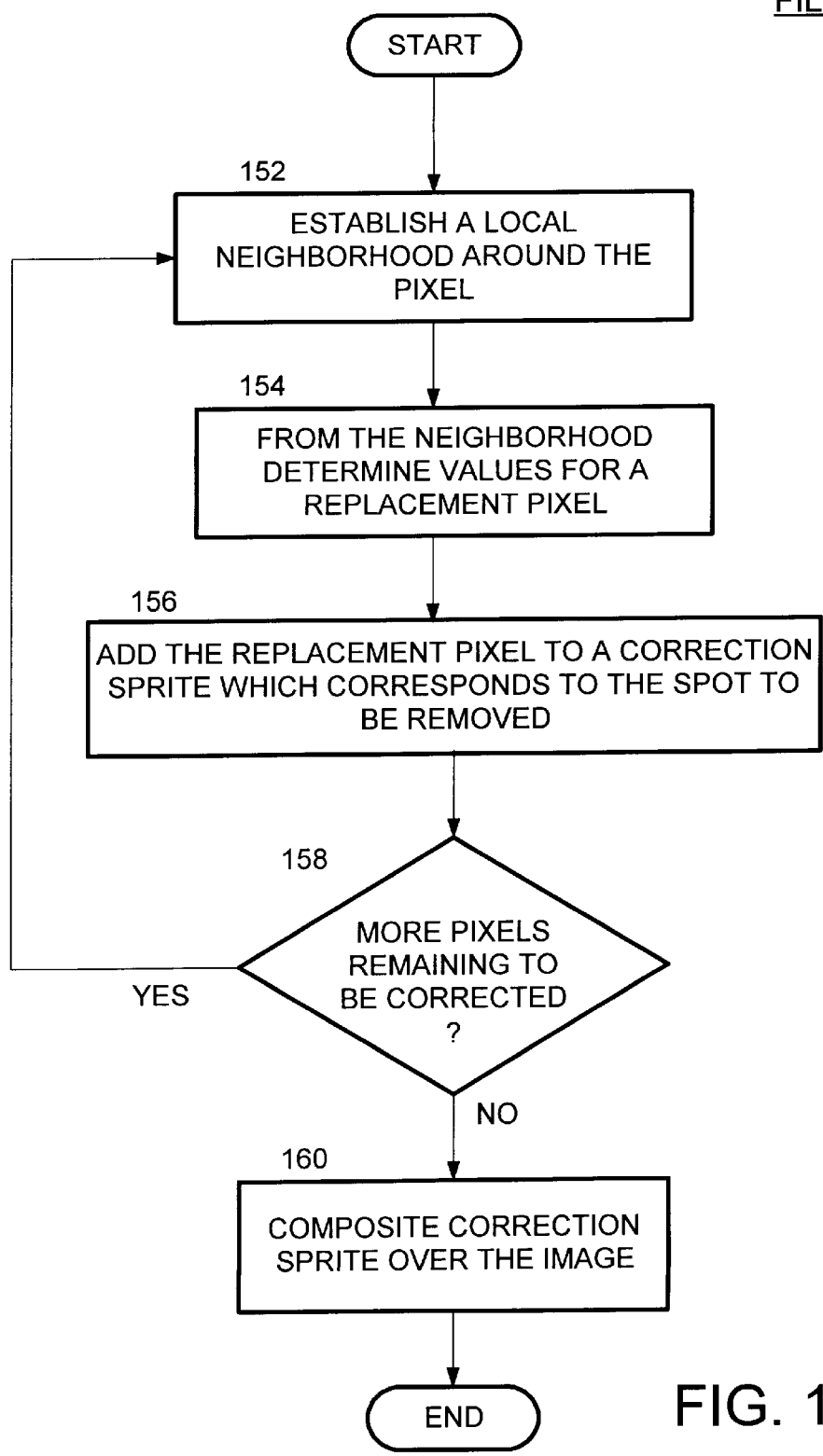
FIG. 11 is a flow chart diagram of the technique for removing the selected spot from the digital image by replacing the corrupted values of the pixels comprising the spot in the original image with values derived from pixels surrounding the spot as identified by the mapping of the mask in FIG. 10 to the original image, where the mapping is determined by registering the center void of the mask with the selected spot.
Figure 12A:
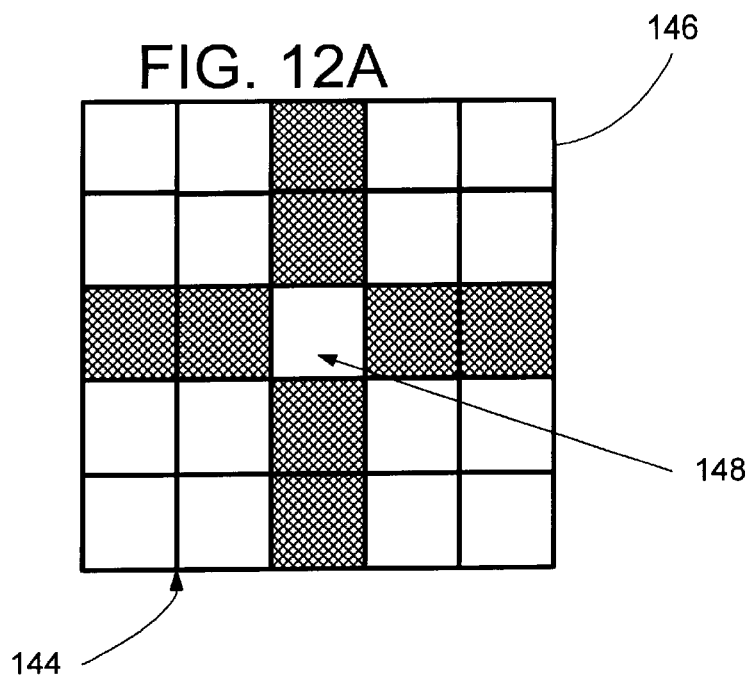
FIG. 12 illustrates two alternative and exemplary formats (A) or (B) for the mask or filter, which has a center void in keeping with the invention, that is sized and shaped to complement the size and shape of the selected spot such that the mask provides a map to pixels in the image whose values are used to derive values that replace the corrupted values of the pixels comprising the spot.
Figure 12B:
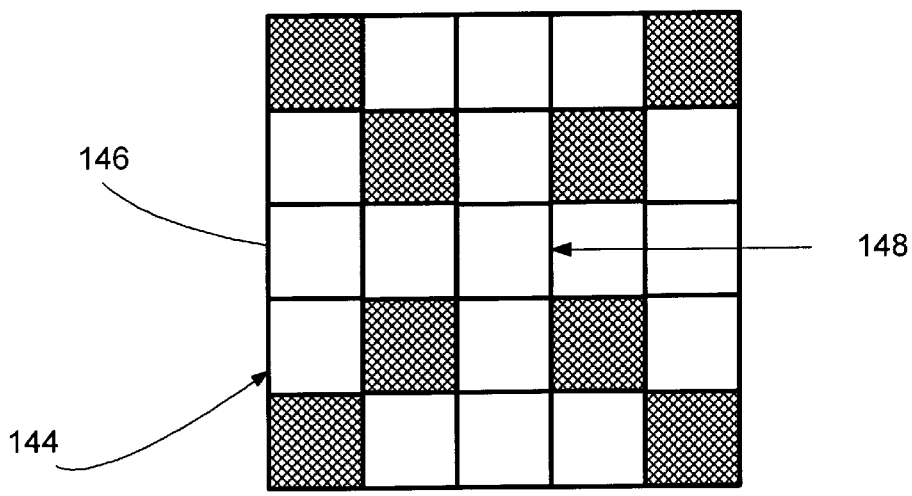
Figure 12B:
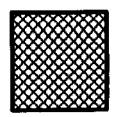
Figure 12B:
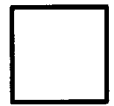
Figure 13:
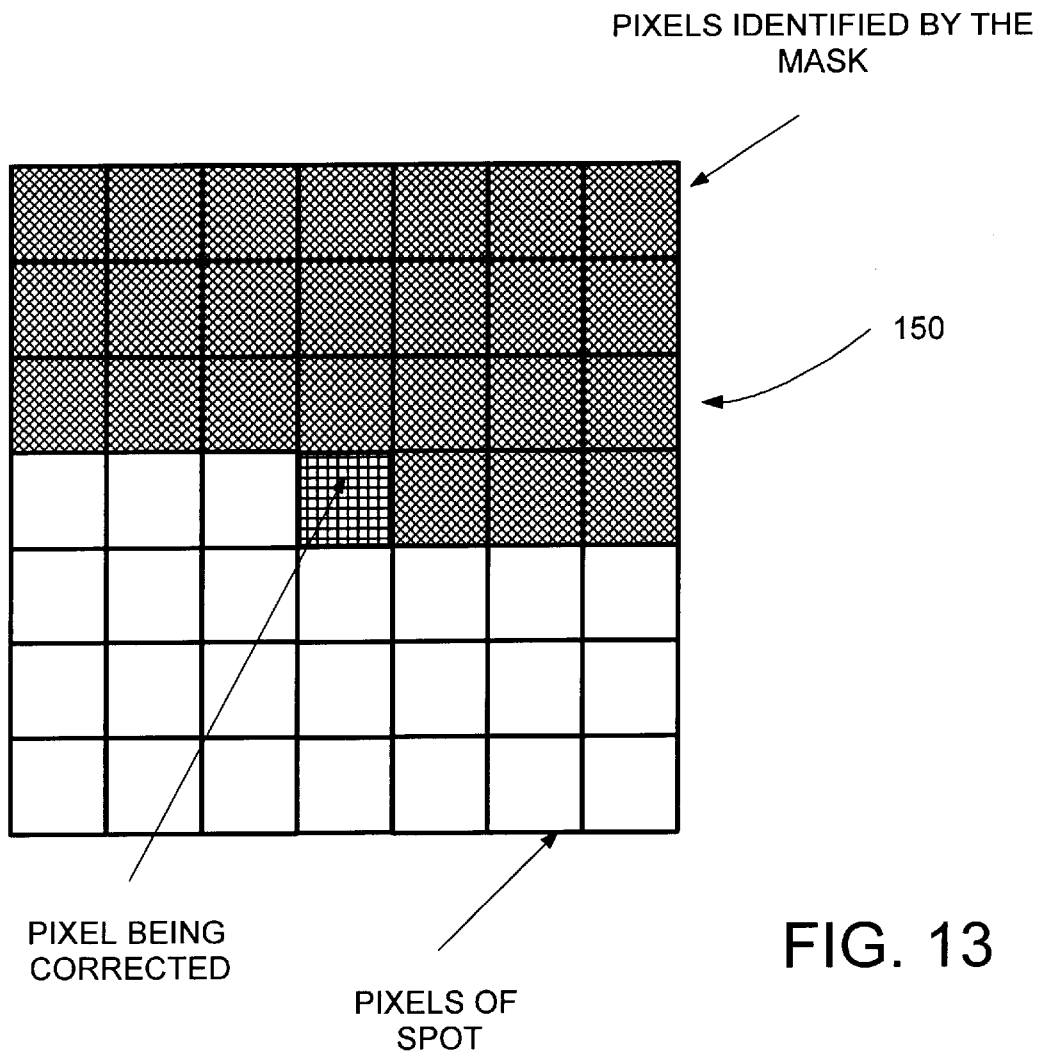
FIG. 13 is an enlarged and isolated portion of the digital image illustrating a selection matrix that is employed to select pixels neighboring a corrupted pixel to be repaired, where the shaded cells indicated pixels that have been identified by the mask.
Figure 14:
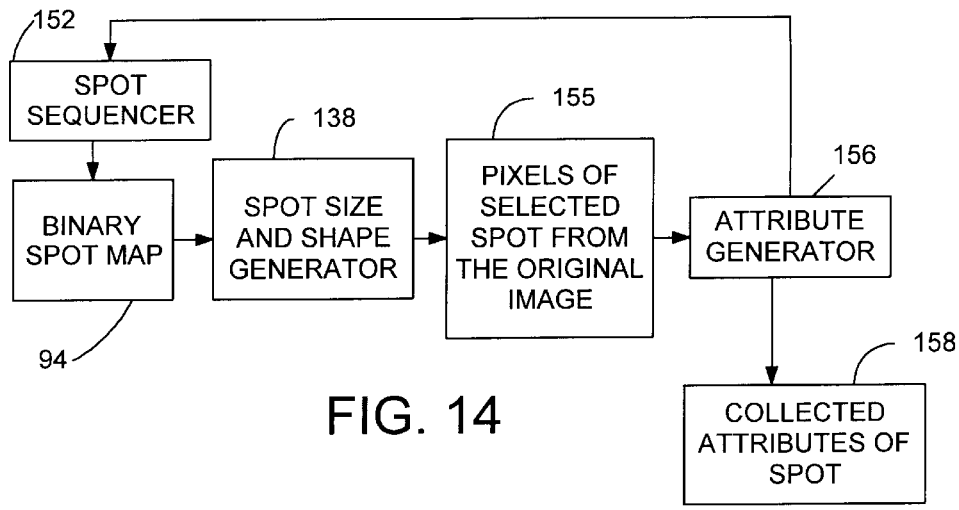
FIG. 14 illustrates the tools and data structures for automatically identifying the location of all spots in an image in keeping with an alternative embodiment of the invention.
Figure 15:
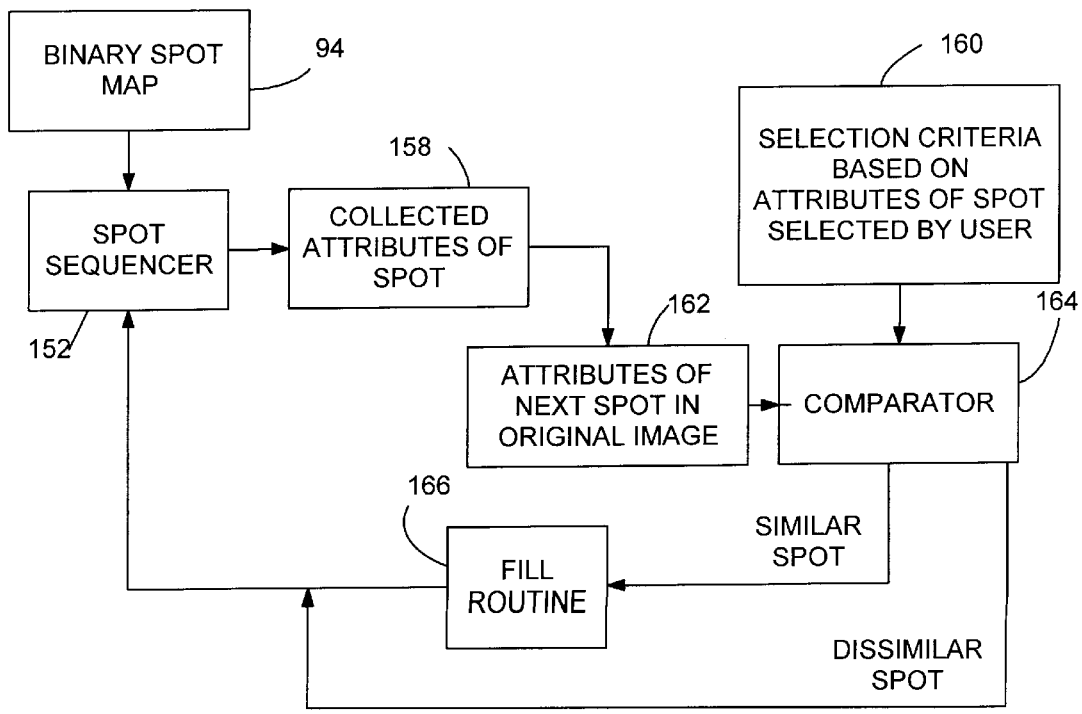
FIG. 15 illustrates the tools and data structures for automatically correcting the pixel values of all the spots in a digital image that have attributes similar to those of the spot identified by the user as the spot the user wishes to remove.

I. Introduction
II. FIG. 2—The System Overview
III. The Invention Is Described As An Application Running On A Computer, But It Can Be Realized By Other Means Too
IV. FIGS. 2 through 3—The User Interface
V. FIGS. 4 and 5A–5B The Spot And Locating The Cursor In Automatic And Manual Modes
VI. FIG. 6 An Overview Of Removing A Spot According To The Invention
VII. FIGS. 7 Through 9A and 9B—Automatic Extraction Of The Spot
VIII. FIGS. 7, 10 and 12—Generating The Mask
IX. FIGS. 11 and 13—The Fill Routine For Correcting The Corrupted Values Of The Pixels Comprising The Spot
X. FIGS. 14 and 15—The Automatic Removal Of All Spots In The Digital Image Similar To The Selected Spot I. Introduction Turning to the drawings, wherein like reference numerals refer to like elements, the-invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

II. FIG. 2—The System Overview

Figure 1:
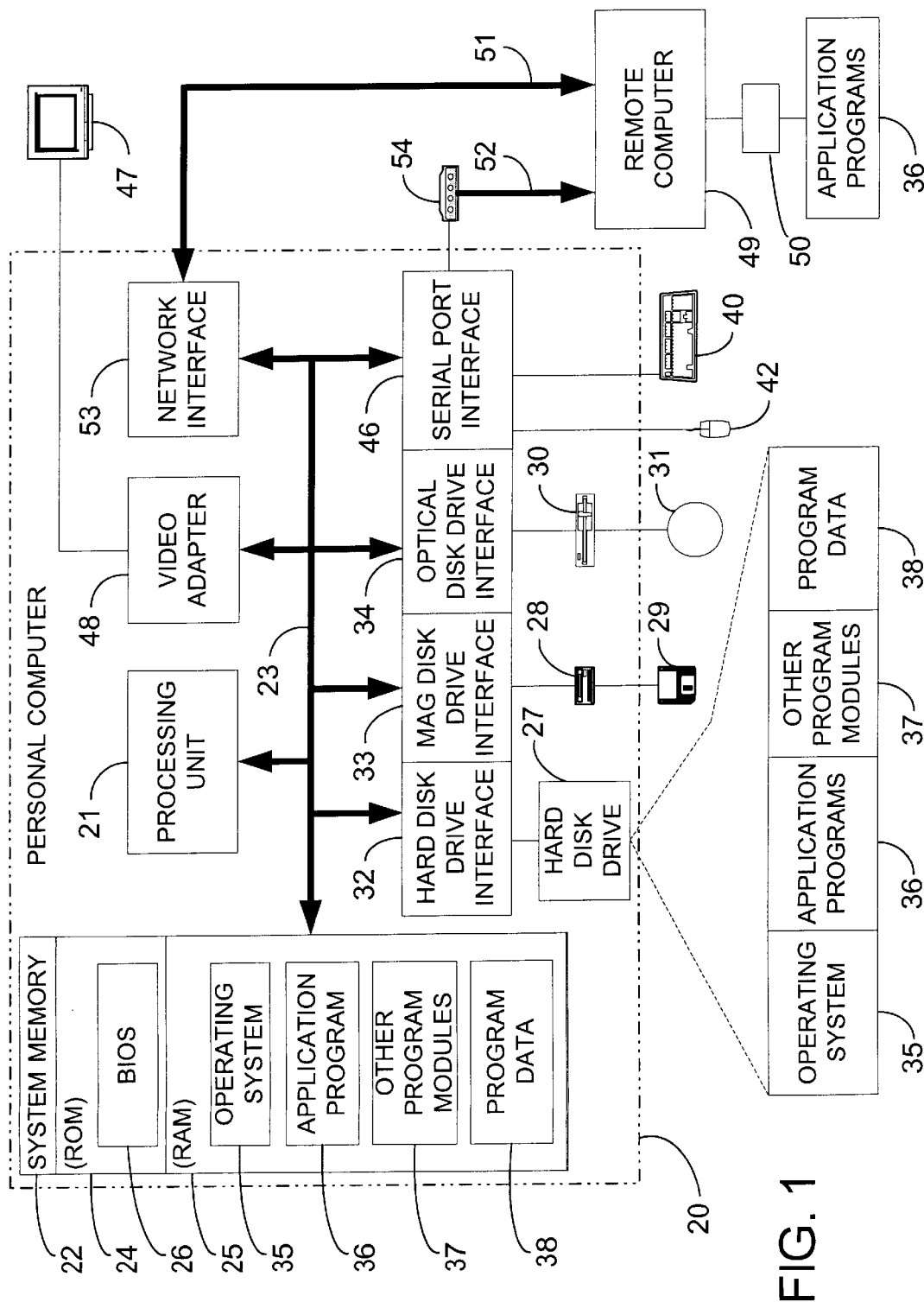
FIG. 1 is a block diagram of an exemplary computer system for editing digital images in accordance with the subject invention.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively.

The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such a magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a KEYBOARD 40 AND POINTING DEVICE OR MOUSE 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

III. The Invention Is Described As An Application Running On A Computer, But It Can Be Realized By Other Means Too In the description that follows, the invention will be described with reference to acts and symbolic representations of operations that are performed by the computer system 20, unless indicated otherwise. As such, it will be understood that such acts and operations, which are at times referred to as being computer-executed, include the manipulation by the CPU 24 of electrical signals representing data in a structured form. This manipulation transforms the data or maintains it at locations in the memory system 22, which reconfigures or otherwise alters the operation of the computer system 20 in a manner well understood by those skilled in the art of computer systems. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As discussed, the spot-removal technique described herein preferably is realized within the computer environment illustrated in FIG. 1 in the form of a computer-executable application 36 which is used to edit a digitized image of an original photograph to remove unwanted portions therefrom. The digitized image typically resides in RAM 25 after being downloaded from a scanner (not shown), the hard disk, the magnetic disk 29, or optical disk 31 or a like memory device associated with the remote computer 49. The digitized image is in a conventional form suitable for display on the monitor 47. Such images are typically stored in memory as graphic files comprising grids of pixel values. Furthermore, while the subject invention is described hereinafter as a method for removing those spots in a digitized image which often result from the deterioration of or damage to an original photograph, the present invention may also be used to remove other naturally occurring features in a digitized picture such as freckles, facial blemishes or the like.

IV. FIGS. 2 through 3—The User Interface

In one embodiment of the invention, the computer-executable application 36 includes a user interface 56 as illustrated in FIG. 2. FIG. 2 is a representation of a screen shot from the application program PictureIt!, Version 2.0, where the operating system 35 resident in the conventional personal computer 20 is Windows 95. The user interface 56 appears on the monitor 47 of FIG. 1 and includes a digital image, represented by the area 58, that may be edited to remove spots in accordance with the invention as explained hereinafter. The user interface 56 also includes a menu 60 comprising a column of active icons such as the "TOUCHUP(J)" icon. In FIG. 2, the TOUCHUP(J) icon has been activated by positioning a cursor (not shown) over the icon, using the mouse 42, and clicking on its active area. The icons of the menu 60 are of a conventional bi-state type commonly used in graphical user interfaces to simulate the function of a mechanical button.

When the TOUCHUP(J) icon is activated, a dialog box 62 is displayed to the user as illustrated in FIG. 2, which prompts the user to select one of three alternative automatic correction techniques. In a first one of the techniques, a red-eye effect in a digital photograph may be automatically corrected. This technique is described in U.S. patent application Ser. No. 08/884,207 filed Jun. 27, 1997, which assigned to the same assignee as that of the present invention. A second technique automatically removes scratches from the digital image. This technique is described in U.S. patent application Ser. No. 08/964,629, filed Nov. 5, 1997, which is also assigned to the same assignee as that of the present invention. The third technique represented in the dialog box is the technique for removing spots in accordance with the present invention.

Each of the editing techniques in the dialog box 62 is launched by the user moving the cursor to one of the three images of paired eyes in the dialog box. Each of the eye pairs is an icon having an active area that will launch the associated editing technique when the cursor is positioned over the active area and followed by a mouse click. The mouse click causes the dialog box 62 to be removed from the user interface 56 and the menu 60 is replaced with the dialog box 64 illustrated in FIG. 2A.

In the dialog box 64 of FIG. 2A, the user is prompted to select two alternative techniques for removing spots. If the spots are relatively small and scattered throughout the image, they are best removed using conventional filtering techniques described above in the "Background" section. However, if the spots are relatively large, the technique according to the invention is preferably employed. Such large spots are exemplified by the spots in the top eye in the pair of eyes 62a in the dialog box 62 for launching the automatic spot removal technique. The dialog box 64 in FIG. 2A asks the user to indicate the characteristics of the spot. If the user clicks on the active region of the icon labeled "JUST A FEW SPECKS," the dialog box 64 is replaced by the dialog box 66 of FIG. 2B, which provides the user with simple instructions for positioning the cursor on the spot in the digital image 58 to be removed and clicking the mouse 42 initiate the automatic removal technique of the invention. If the user is not satisfied with the results, the editing can be undone by clicking on the bi-state icon or button labeled "UNDO LAST ACTION." If the user is satisfied with the correction resulting from the removal of the spot, the user can either move the cursor to the next spot to be removed or the editing technique can be terminated by clicking on the bi-state icon labeled by the legend "DONE."

The image of the pair of eyes 62a from the dialog box 62 is enlarged and reproduced in FIG. 3 in order to better illustrate an exemplary area of the digital image 58 that may include spots of the type best corrected by the editing technique of the invention. The top image illustrates the eye with unwanted spots such as the spot 68. The bottom image in FIG. 3 illustrates the same eye with the spots removed by the editing technique of the invention.

V. FIGS. 4 and 5A–5B The Spot and Locating The Cursor In Automatic And Manual Modes FIG. 4 illustrates the exemplary unwanted spot 68, which is hereinafter taken to be a spot in the digital image 58, with a location of the user's click on the mouse 42 represented by a diamond-shaped symbol 70. Each square in the illustrated grid is a cell 72 of one or more pixels comprising the digital image 58. In the automatic mode of the invention, the user need not precisely position the cursor, since the editing technique automatically locates the spot as described hereinafter. As suggested by the location 70 of the mouse click in FIG. 4, the user need only approximately indicate the location of the spot to be removed. The spot will be automatically located using the location of the mouse click as a reference point for a search to find the spot. However, in a manual mode of the invention, a simplified implementation of the editing technique of the invention assumes the location 70 of the click to precisely identify the location of the spot. In such an embodiment, the center void area of a mask described hereinafter assumes default characteristics.

The following detailed description of identifying the spot for removal is directed to the automatic mode, which automatically searches for and extracts the spot the user intends to remove. In the manual mode, the spot is assumed to be at the location of the mouse click. Regardless of how the spot is located in the image 58, it is removed the same way, which involves generating a center void mask as explained hereinafter, registering the center void of the mask to the spot, mapping the mask to the pixels surrounding the spot and employing the pixels identified from the mapping for correcting the corrupted values of the pixels comprising the spot.

FIGS. 5A and 5B illustrate alternative configurations for an on-screen cursor that appears when the cursor is moved over the digital image 58 of the user interface 56. The user controls the mouse 42 to move the cursor to an area of the digital image 58 that is proximate the spot 68 the user wishes to remove. As explained in further detail hereinafter, the cursor of FIG. 5A includes a cross-hair 74 enclosed by a sizable circle 76. In the automatic mode, the circle 76 functions to define a boundary for the pixel region in which the editing technique of the invention searches for candidate spots. In the manual mode, the circle may be sized be approximately coincident with the boundary of the spot. The size of the circle can then be used by the automatic editing technique of the invention as described hereinafter to size the area of the mask's center void. As suggested by the illustration of the cursor in FIG. 5A, the circle can be sized by the user using conventional user interface techniques.

FIG. 5B illustrates the cross-hair cursor 74 for locating the spot to be removed from the digital image 58 without the circle 76 limiting the pixel area to be searched for spot candidates. In this embodiment, the editing technique of the invention assumes a region of a pre-set size for searching for the spot 68. Likewise, in the manual mode, a preset size is assumed for the spot using the cursor of FIG. 5B VI. FIG. 6 An Overview Of Removing A Spot According To The Invention Referring to the flow diagram of FIG. 6, the automatic removal of spots from the digital image 58 preferably begins at step 78 by the user first determining whether the spots are of one of two possible categories as described above. The user visually inspects the digital image 58 to determine whether the spots are substantially uniformly distributed over the entire digital image or whether they are blotchy in character and localized or unevenly distributed in the digital image 58. In the user interface of FIGS. 2, 2A and 2B, the dialog box of FIG. 2A prompts the user to make this determination based on a visual evaluation of the image 58. In step 78, if the user determines that the spots are small and substantially uniformly distributed throughout the digital image 58, a conventional uniform filtering of the entire image is automatically carried out at step 79 in response to the appropriate user input on the dialog box 64. If the user judges the spots to be blotchy and unevenly distributed in the image 58, the dialog box prompts the user to activate the icon that branches the flow diagram to step 80 of the flow diagram of FIG. 6.

In step 80, the application 36 executing the technique of the invention prompts the user to identify the spot in the digital image 58 that the user wishes to remove. In this regard, the dialog box 66 of FIG. 2B is one embodiment of the user interface 56 for accomplishing step 80.

After the user has indicated the approximate location of the spots to be removed in step 80, the application program automatically locates and removes the spot in keeping with the steps 82, 84 and 86 in the flow diagram of FIG. 6.

As explained more fully hereinafter in connection with the flow diagram of FIG. 7, the automatic removal of the identified spot begins in step 82 of the flow diagram of FIG. 6 by searching for spots in a neighborhood of the location designated by the positioning of the cursor (FIGS. 5A or 5B) by the user. Each of the candidates is compared against predetermined criteria, which include distance from the point designated by the cursor, in order to select one of the candidate spots as the spot 68 to be removed. Preferably, the other predetermined criteria include size, mean intensity and contrast along the boundary of the spot. The size and the shape of the selected spot are used to customize the shape and size of a center void of a mask that is used as a map to identify pixels surrounding the spot for use in generating replacement values for the corrupted values in the pixels of the spot.

In step 84, a correction sprite is generated for compositing with the digital image 58 in order to remove the unwanted spot. As explained in further detail in connection with the flow diagram of FIG. 11, the medium void filter or mask generated in step 82 is used as a map to identify the location of pixels in the digital image 58 whose values are not corrupted and whose locations are in a neighborhood surrounding the spot. After the correction sprite is created using the medium void filter or mask in step 84, the sprite is composited with the original image in step 86 using conventional compositing techniques. In this regard, the sprite is mapped to the pixels identified as comprising the spot in the digital image. In step 88, the user is prompted to either continue editing additional spots by returning to step 80 or exiting the editing routine, which in the dialog box 66 of FIG. 2B is accomplished by moving the cursor to the active area of the "DONE" bi-state icon and clicking the mouse 42.

VII. FIGS. 7 Through 9A and 9B—Automatic Extraction Of The Spot

Referring to FIGS. 7 through 9A and 9B, the editing technique of the invention automatically extracts spots from the region of the digital image 58 that has been designated by the user. The spots are candidates from which the unwanted spot to be removed is selected. Referring to FIG. 8A, in general the user employs a tool 90 such as one of the cursors in FIGS. 5A or 5B to identify the region or area of the digital image 58 within which the unwanted spot 68 is located. With the region or image identified by the tool 90, a $\nabla^2 G$ operator 92 inspects each of the pixels in a neighborhood around the location designated by the user's mouse click. Using a zero crossing threshold, the $\nabla^2 G$ operator 92 creates a binary map 94 in one of the memories 38 in FIG. 1, which indicates the locations of maximum or minimum contrast in the digital image 58. The map 94 is registered to the digital image 58 so that the locations in the map correspond to locations in the image that are spot-like and, therefore, candidates from which the spot 68 to be removed is selected. Each one of the binary fields in the map 94 preferably corresponds to one of the pixels in the region of the digital image 58 inspected by the $\nabla^2 G$ operator 92.

Referring to the flow diagram of FIG. 7, the editing technique begins the extraction process in step 96 by collecting intensity or one of the red, green or blue values for each pixel in the neighborhood designated by the location of the cursor. In step 98, the $\nabla^2 G$ operator 92 responds to the collected values by creating the binary map 94 locating spots that are candidates from which the unwanted spot 68 to be removed is selected.

The $\nabla^2 G$ operator 92 is a well-know imaging processing technique that is described in a text entitled "Vision" by David Marr and published by W. H. Freeman Co. of San Francisco(1980), which is hereby incorporated by reference. In steps 100 through 104 of the flow diagram of FIG. 7, the candidate spots located in the binary map 94 are further processed in order to select one of them as the spot 68 to be removed. In order to select one of the spots, a sequencer 116 in FIG. 8B applies a gradient operator 118 to each of the pixels in the region 120 surrounding the location 70 identified by the user. For correcting a single spot, analysis and application of the $\nabla^2 G$ and gradient operators 92 and 118, respectively, may be restricted to a small area. However, when multiple spots are to be automatically corrected, the region inspected by the $\nabla 2G$ operator 92 is likely to be larger than that inspected by the gradient operator 118. In fact, as explained more fully hereinafter, the region inspected by the $\nabla^2 G$ operator may be the entire digital image.

From the inspection of the region 120 of the digital image 58 by the gradient operator 118, a line segment map 122 is generated in one of the memories 38 of FIG. 1. As indicated in step 100 of the flow diagram illustrated in FIG. 7, the gradient operator 118 identifies a pair of opposing gradient values along each row and column of the region. The rows 124 and columns 126 are schematically represented in the illustration of the spot 68 in FIG. 9A.

Figure 8A:
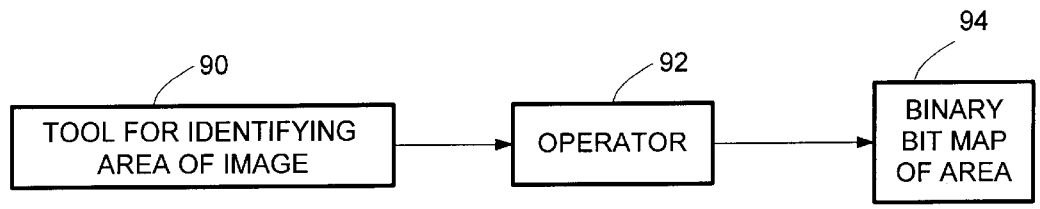
FIGS. 8A through 8C are schematic diagrams illustrating the tools and data structures of an exemplary embodiment of the invention for precisely locating a spot to be removed, after its general location has been identified by the user's interaction with the user interface of FIG. 2, where.
Figure 8B:
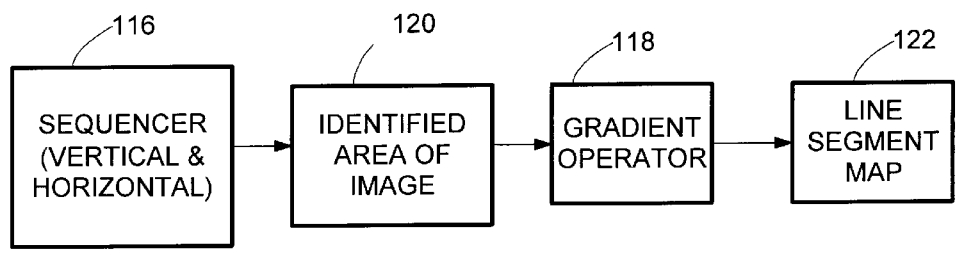
Figure 9A:
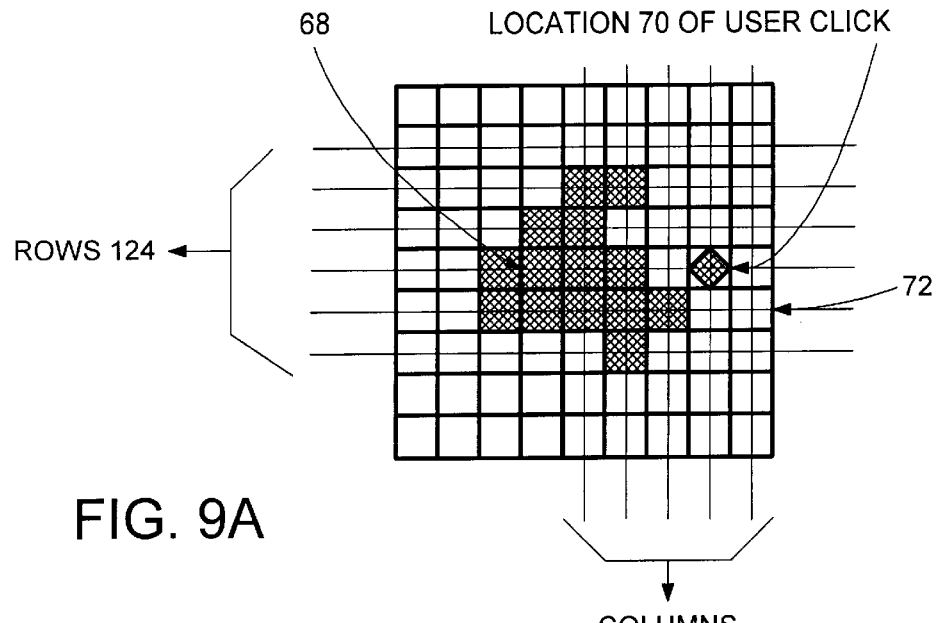
FIG. 9A illustrates the spot in FIG. 4 that has been identified by the user with a grid overlaying the image area and approximately centered at the image location identified by the user's positioning of the cursor tool of either FIGS. 5A or 5B, where the rows and columns of the grid represent the extent of the search area for selecting spot candidates.

The procedure continues in step 102 of FIG. 7, utilizing the gradient operator 118 to generate line segments along the rows 124 and columns 126 of pixels in the identified region 120 of the digital image 58 (FIG. 9A). The attributes of the pixels of each row 124 and column 126 of the region 120 are identified and examined according to predetermined criteria for the purpose of creating a grid of line segments 122 in the region 120 of the digital image 58 identified by the user as containing the unwanted spot 68. As suggested by illustrated rows 124 and columns 126 in FIG. 9A, the sequential examination of the rows and columns of pixels is centered around the pixel or pixels identified by the user's positioning of the cursor on the digital image 58. The sequencer 116 in FIG. 8B applies the gradient operator 118 along the rows 124 and columns 126 of the identified region 120 of the image 58, which generates the map 122 of the line segments. The representations of the spots in the image 58 by the binary map 94 that intersect the line segments 122 are selected as candidates for the spot to be removed.

Figure 9B:
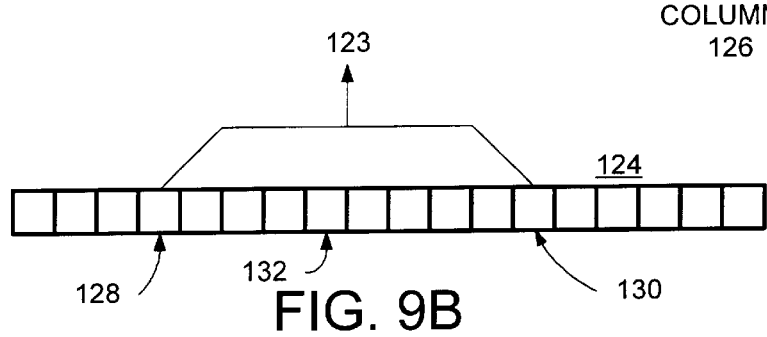
FIG. 9B is an illustrative example of a section of a row of pixels in the image area of FIG. 9A corresponding to one of the rows of the grid in FIG. 9A, wherein points of maximum contrast are found having opposing contrast gradients.

As exemplified by one of the rows 124 isolated and enlarged in FIG. 9B, each of the line segments 123 generated by the gradient operator 118 and sequencer 116 of FIG. 8B has endpoints 128, 130 such that: 1) the summed contrast magnitude at the endpoints is maximized; 2) the image gradient is in opposite directions at the endpoints; and 3) the point 132 with maximal contrast between the two endpoints has a contrast less than the contrast at either endpoint and less than a predefined threshold. By way of example, for color images, the contrast between successive pixels p[i] is computed by the formula:

$$\text{abs}(p[i]_{RED} - p[i+1]_{RED}) +$$
$$\text{abs}(p[i]_{GREEN} - p[i+1]_{GREEN}) + \text{abs}(p[i]_{BLUE} - p[i+1]_{BLUE})$$

and the signed contrast by the formula:

$$(p[i]_{RED} + p[i]_{GREEN} + p[i]_{BLUE}) -$$
$$(p[i+1]_{RED} + p[i+1]_{GREEN} + p[i+1]_{BLUE}).$$

Utilizing the above formulas, a line segment is identified within each row 124 and column 126 illustrated in FIG. 9A.

In a further embodiment of the invention, the process of defining the line segments may be biased as a function of the determined end points of neighboring line segments, where the consideration of spurious pixels in one of the rows 124 or columns 126 is sought to be minimized.

Furthermore, once all the spots has been identified by the $\nabla^2 G$ operator 92, several standard feature attributes may be associated with each of them. For example, for each color component within one of the spots, these features may include the mean, variance, minimum, and maximum values as well as the contrast magnitude at the spot's border. These features may be utilized in yet a further embodiment of the invention described hereinafter for automatically removing all spots identified in the map 94 having similar characteristics as those of the spot 68 selected as the one identified by the user.

Figure 8C:
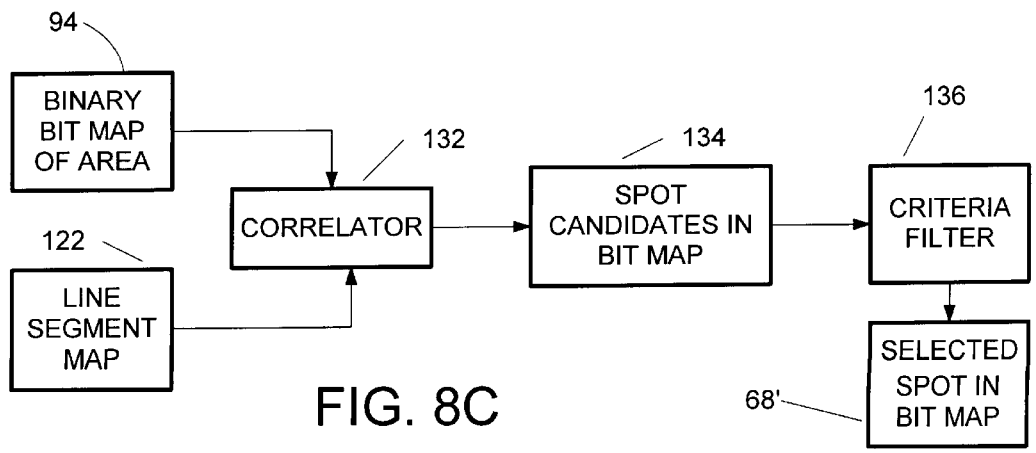

With both the binary map 94 and the line segment map 122 generated, a correlator 132 in FIG. 8C identifies the spot or spots in the binary map that are intersected by the line segments when the two maps are overlaid. The spots that intersect line segments are spot candidates 134 from which is selected the spot 68 to be removed. When the correlation of the two maps 94 and 122 produces more than one candidate, a criteria filter 136 is applied in order to select the spot to be removed. This criteria filter includes size, median intensity and contrast requirements and the relative distances of the spots from the location 70 clicked on by the user (FIG. 4).

In the flow diagram of FIG. 7, the editing technique identifies spots intersecting the line segments in step 102 and selects the spot 68 to be removed from the candidates of spots in step 104. An alternative approach for extracting an unwanted spot 68 for removal from the digital image 58 is described in the aforementioned U.S. patent application Ser. No. 08/964,629 entitled "AUTOMATED REMOVAL OF NARROW, ELONGATED DISTORTIONS FROM A DIGITAL IMAGE" to Lawton and Qadir, filed on Nov. 5, 1997, which is hereby incorporated by reference.

VIII. FIGS. 7, 10 and 12—Generating The Mask

Referring to the schematic diagram of FIG. 10 and the steps 106 through 114 of the flow diagram in FIG. 7, the selected spot 68 from the binary map 94 identifies the location of the spot 68 in the digital image 58. The complete spot 68 in the digital image 58 is found via connected components or simple region growing with respect to the area 68' of the spot identified in the map 94 by the binary thresholded $\nabla^2 G$ operator. In the diagram of FIG. 10, this function is provided by the spot size and shape generator 138. With the size and shape of the spot determined in step 106, attributes of the spot 68 are collected from the original digital image 58 in step 108—e.g., minimum, maximum, average, variance and contrast magnitude. These attributes are used for a dynamic filling of the corrupted pixels values of the spot 68 as described hereinafter and for finding similar spots for removal in accordance with the embodiment of FIGS. 14 and 15.

In step 110 in the flow diagram of FIG. 7, the quality of the spot is evaluated with respect to predetermined size, median intensity, contrast and shape criteria and the relative distance of the spot from the location 70 clicked on by the user. If the size and shape of the spot 68 do not meet these criteria, the editing technique uses a default value for the size and shape of the center void of the mask in step 112. Otherwise, the editing technique bases the size and shape of the center void for the mask on the size and shape of the selected spot 68 in step 114.

Again referring to FIG. 10, a mask generator 140 modifies a pre-set format 142 for the center void mask in response to the size and shape information received from the generator 138. In keeping with step 114 in the flow diagram of FIG. 7, the mask generator 140 customizes the size and shape of the center void of the mask 142 to achieve a customized mask 144 for use in removing the spot 68.

The mask 144 is illustrated in FIG. 12 as having two alternative and exemplary formats 142. In each of the representations of the format for the mask 144 in FIG. 12, each square in the illustrated grid represents a cell 146 that maps to one or more pixels in the digital image 58. As explained more fully hereinafter, the shaded cells are mapped to pixels that are used in the editing technique to generate replacement values for the corrupted values of the pixels comprising the spot. The white or empty cells 146 represent pixels whose values are ignored in the correction process.

In keeping with the invention, the center of the mask 144 is always a void (i.e., white or empty cells) that is preferably shaped and sized to match the shape and size of the selected spot 68 to be removed. The customized center void 148 of the mask 144 is registered to the spot to be removed in the digital image 58. For simplicity of illustration the center void is illustrated as a square, but its true shape is similar to the shape of the spot 68.

In order to initiate the process of correcting the corrupted pixels of the spot 68, the mask (the shaded cells of the mask in FIGS. 12A or 12B) is mapped to the pixels of the digital image 58 surrounding the spot 68. These pixels are thereby identified to the fill process as the pixels from which correction values will be derived as described hereinafter.

IX. FIGS. 11 and 13—The Fill Routine For Correcting The Corrupted Values Of The Pixels Comprising The Spot The removal of each pixel is effectuated by compositing or replacing the pixel with a replacement pixel, whose values are determined from a local neighborhood of pixels. Referring to FIG. 13, the preferred neighborhood is a 7×7 matrix of pixels surrounding the pixel to be removed. Pixels in the matrix but outside the area of the mask 144 are indicated by the white cells 150 in FIG. 13 and they are excluded from the calculation. It will be appreciated that matrices of other sizes, for example a 5×5 matrix, may also be used without departing from the scope of the subject invention.

In step 152 of the flow diagram of FIG. 11, the local neighborhood of pixels from which replacement values will be derived is determined. With the mask 144 mapped to the digital image, the pixels of the neighborhood are fully determined. In step 154 of the flow diagram of FIG. 11, each of the values for replacing a corrupted value of one of the pixels comprising the spot 68 are determined as a function of the values of those pixels within the neighborhood which meet a predetermined criteria. By way of example, the values for the replacement pixel may be an average of the values of the useable pixels within the neighborhood. The pixels from the neighborhood are useable only when they are mapped to areas of the mask 144 or located within the center void 148 of the mask, but only if they have previously had their corrupted image values corrected by the fill process. This iterative process is complete when the all of the pixels comprising the spot have been repaired.

In yet a further embodiment of the invention, the criteria for selecting neighborhood pixels can be adaptive wherein only a predetermined number of pixels which most closely meet a predefined criteria are used in the valuation process. In addition, those of skill in the art will appreciate that various other forms of filtering and averaging may also be employed to establish the values for the replacement pixel.

Once the values for a replacement pixel have been determined, it is preferred that the replacement pixel be added to a digital correction sprite or image in step 156 which is ultimately composited with the digital source image 58 in step 160 upon the completion of the iteration process at step 158. The compositing of the digital correction sprite with the digital image 58 results in the effective removal from the image of the spot 68, which was identified by the user. The digital correction sprite is stored in one of the memory devices of FIG. 1 such a RAM 25 as it is being built and, when complete, will correspond to the size and shape of the spot 68. It will further be appreciated that it is also possible to directly composite or replace each individual pixel within the spot 68 after each step in the iteration.

X. FIGS. 14 and 15—The Automatic Removal Of All Spots In The Digital Image Similar To The Selected Spot As previously mentioned, if the user intends to remove additional spots in the digital image 58, the editing technique described above is repeated, with the user initiating it in the same manner. Once the user has selected a further spot for removal, the spot will be automatically removed as described above. This cyclic process continues until the user has removed all the unwanted spots.

In accordance with an alternative embodiment of the invention, all spots having characteristics similar to the first spot identified by the user are automatically corrected while requiring the user to identifying only the first unwanted spot. This embodiment of the invention, which is illustrated in FIGS. 14 and 15, may be used both to remove spots that do not occur naturally in the digital image and also to remove naturally occurring but unwanted spots such as facial blemishes and freckles.

In the embodiment of the invention illustrated in FIGS. 14 and 15, the editing technique described above remains the same. However, during the editing process, attributes of the first spot are collected and formatted as selection criteria for identifying other spots in the digital image that are similar in character, which are then assumed to also be unwanted spots and, therefore, also automatically removed. Also, the binary map 94 is generated for the entire digital image 58 in step 98 so that the map includes the location of all spot candidates, some of which may be similar to the spot 68 and, therefore, likely to also be unwanted spots.

Using the map 94 to identify the other spots, an alternative embodiment of the invention removes the spot 68 and all other spots in the image 58 that have similar characteristics. The attributes of the other spots are collected and compared to the attributes of the spot 68. If the comparison of the attributes indicates the spot are similar to those of the spot 68, the spot is removed in the same manner as described herein with respect to spot 68. The collection of the attributes, the comparison of the attributes with the attributes of the spot 68 and the removal of the spot can be accomplished in a single sequential investigation of each of the spots or the collection of the attributes can be done first and in a sequence separate from a sequence for the comparison and removal. In the following illustrated embodiment, the collection of the attributes is shown as a separate sequence from the sequence for comparing the attributes and removing the spots identified by the map 94.

In the schematic diagram of FIG. 14, a sequencer 152 points to each of the other spots in the binary map 94. Preferably, the region designated by the map 94 is grown using the spot and shape generator 138 from FIG. 10 in order to identify all of the pixels 155 of the spot in the image 58. The attributes of the pixels 155 comprising the spot are generated by the attribute generator 156 and the attributes 158 of the spot are collected in one of the memories of the RAM 25. The sequencer then identifies the next spot and the iterative process of the collecting the attributes continues until all the spots have been investigated and their attributes collected.

In the schematic diagram of FIG. 15, the collected attributes 158 of each of the spots are compared to criteria 160 based on the attributes of the spot 68, which include size, contrast and median intensity. The sequencer 152 again passes through each of the spots identified by the binary map 94. In this pass, however, the previous collected attributes 162 of each of the spots are compared to the criteria 160 by the comparator 164, which divides the spots into two categories—i.e., spots similar and dissimilar to the spot 68. If a spot is categorized as dissimilar, it is not removed and the sequencer 152 moves to the next spot. If the spot is categorized as similar the fill routine 166, whose flow diagram is illustrated in FIG. 11, is initiated in order to remove the spot. This iterative process continues until all of the pots have been compared and either removed or passed over.

The foregoing describes several embodiments for automatically removing unwanted spots from a digital image. In keeping with the invention, the removal of such unwanted spots is generally accomplished by the user first identifying a region of the digital image, then the application program 32 automatically locating, extracting and repairing a spot within the region using certain attributes describing the visual characteristics of areas of the digital image surrounding the spot. When viewed in this manner, a similar approach to digital image editing is described in commonly owned U.S. patent application Ser. No. 08/964,629 entitled "AUTOMATED REMOVAL OF NARROW, ELONGATED DISTORTIONS FROM A DIGITAL IMAGE" to Lawton and Qadir, filed on Nov. 5, 1997, which is hereby incorporated by reference in its entirety.

In view of the many possible embodiments to which the principles of this invention may be applied, the embodiments described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention, including the details of the user interface 56. Therefore, the invention as described herein contemplates all such embodiments as may come within the scope of the following claims and equivalents thereof.

We claim:

1. A method of removing a spot from a digital image generated at a user interface of a computer system, the method comprising the steps of 1) a user of the computer system identifying a location of a spot to be removed in the digital image in response to prompting by the user interface; 2) determining a location of the spot based on the location identified by the user; 3) automatically collecting attributes of pixels comprising the digital image in a neighborhood around the spot and excluding pixels comprising the spot; and, 4) correcting corrupted values of the pixels of the spot with replacement values derived at least in part from the attributes of the neighboring pixels.

2. The method of claim 1 wherein determining the location of the spot includes the step of automatically searching an area of the digital image around the location identified by the user.

3. The method of claim 1 wherein determining the location of the spot includes the step of taking the location in the digital image identified by the user as part of the spot to be removed.

4. The method of claim 1 wherein the step of collecting attributes of pixels neighboring the spot includes the step of generating a mask having a center void and applying it in registration with the spot.

5. The method of claim 1 including the step of collecting attributes of the spot.

6. The method of claim 5 wherein the attributes of the spot are used to size and shape a center void of a mask, where the mask provides a map to pixels with the center void applied to the spot.

7. The method of claim 5 wherein the spot attributes are used to locate and remove other spots in the digital image having similar attributes.

8. In a computer system, a method for correcting spots in a pixel image comprising the steps of: identifying a spot in the image; constructing a mask registered with the pixel image having a center void whose size is a function of one or more attributes of the spot; identifying from the mask a set of pixels in the image surrounding the spot; sampling the set of pixels; and, filling the spot with image information derived from the sampling of the set of pixels.

9. The method of claim 8 wherein the step of identifying the spot includes collecting a set of attributes of a region surrounding the spot and using the set of attributes to delineate the spot.

10. The method of claim 9 including the step of identifying additional spots in the pixel image using the set of attributes.

11. The method of claim 8 wherein the one or more attributes includes a size of the spot such that the size of the center void of the mask is proportional to the size of the spot.

12. The method of claim 8 including the step of dynamically determining during the sampling of the set of pixels which ones of the pixels are used to derive the image information for filling the spot.

13. The method of claim 8 wherein the step of filling the spot includes the step of determining a median value of an intensity of at least some of the set of pixels.

14. The method of claim 8 wherein the step of filling the spot includes the step of determining a median value for each of the RGB values of at least some of the set of pixels.

15. In a computer system, a method of removing a spot from a digital image, the method comprising the steps of: interrogating image attributes of pixels in an area of the digital image designated by a user of the computer system; comparing the image attributes of the pixels to criteria stored in a memory of the computer system to determine a location, a size and a shape of the spot; sizing a center void of a mask to the size of the spot; registering the center void of the mask to the spot in the digital image; mapping the mask to pixels in the digital image; filling the pixels of the spot with image attributes derived from image attributes of the pixels identified by the mapping of the mask to the digital image.

16. A computer-readable medium for correcting spots in a pixel image and having computer-executable instructions for performing the steps comprising: identifying a spot in the image; constructing a mask mapped to the pixel image having a center void whose size is a function of one or more attributes of the spot; identifying from the mask a set of pixels in the image surrounding the spot; sampling the set of pixels; and, filling the spot with image information derived from the sampling of the set of pixels.

17. The computer-readable medium as recited in claim 16, further performing the steps of displaying the pixel image on a display device associated with the computer system and identifying an area of the pixel image in response to a user interacting with the displayed pixel image from which attributes of the pixels are examined in order to identify the spot.

18. The computer-readable medium as recited in claim 16, wherein the step of identifying the spot further comprises the step of using a $\nabla^2 G$ operator to identify a border of the spot.

19. The computer-readable medium as recited in claim 18, wherein the step of identifying the spot comprises the step of evaluating adjacent pixels using the $\nabla^2 G$ operator with respect to predetermined criteria to determine whether the adjacent pixels have expected attributes of a border of the spot.

20. The computer-readable medium as recited in claim 16, wherein the fill process comprises the steps of locating within the spot a pixel to be corrected, establishing a local neighborhood of pixels around the pixel to be corrected, determining from the values of the neighborhood of pixels replacement values for the pixel to be corrected, and substituting the replacement values for original values of the pixel to be corrected.

21. An apparatus for removing a spot from a digital image displayed at a user interface of a computer system, the apparatus comprising: a user interface for identifying a location of a spot to be removed in the digital image in response, including at least one dialog box for prompting a user to identify the spot using an on-screen cursor; means for determining a group of pixels in the digital image comprising the spot based on the location identified by the user; 3) a collection of attributes of pixels comprising the digital image in a neighborhood around the group of pixels comprising the spot, but separate from any collection of attributes of pixels comprising the spot; and, a fill routine for correcting corrupted values of the pixels of the spot with replacement values derived at least in part from the attributes of the neighboring pixels.

22. The apparatus of claim 21 including means for automatically identifying all groups of pixels in the digital image that may be unwanted spots.

23. The apparatus of claim 22 including a collection of attributes of all the groups of pixels that may be unwanted spots and means for comparing the attributes of each group with the attributes of the group of pixels for the spot identified by the user and applying the fill routine only to those groups of pixels having attributes similar to the attributes of the group of pixels comprising the spot.

* * * * *

UNITED STATES PATENT AND TRADEMARK OFFICE
CERTIFICATE OF CORRECTION

PATENT NO. : 6,160,923
DATED : December 12, 2000
INVENTOR(S) : Lawton et al.

It is certified that error appears in the above-identified patent and that said Letters Patent is hereby corrected as shown below:

Title page,
Item [56], References Cited, OTHER PUBLICATIONS, "Huang et al.," reference "Receognition" should read -- Recognition --.
Item [57], ABSTRACT,
Line 13, "pixels Several" should read -- pixels. Several --.

Column 6,
Line 24, "the-invention" should read -- the invention --.

Column 18,
Line 35, "user; 3)" should read -- user --.

Signed and Sealed this

Twenty-third Day of December, 2003

JAMES E. ROGAN
*Director of the United States Patent and Trademark Office*